United States Patent
Shinohara et al.

(10) Patent No.: US 9,069,640 B2
(45) Date of Patent: Jun. 30, 2015

(54) PATCH APPLYING METHOD FOR VIRTUAL MACHINE, STORAGE SYSTEM ADOPTING PATCH APPLYING METHOD, AND COMPUTER SYSTEM

(75) Inventors: Daisuke Shinohara, Yokohama (JP); Wataru Okada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 277 days.

(21) Appl. No.: 13/500,891

(22) PCT Filed: Mar. 23, 2012

(86) PCT No.: PCT/JP2012/002008
§ 371 (c)(1),
(2), (4) Date: Apr. 6, 2012

(87) PCT Pub. No.: WO2013/140460
PCT Pub. Date: Sep. 26, 2013

(65) Prior Publication Data
US 2013/0254765 A1  Sep. 26, 2013

(51) Int. Cl.
*G06F 9/455* (2006.01)
*G06F 9/445* (2006.01)

(52) U.S. Cl.
CPC .............. *G06F 8/65* (2013.01); *G06F 9/45533* (2013.01)

(58) Field of Classification Search
None
See application file for complete search history.

(56) References Cited

U.S. PATENT DOCUMENTS

| | | | |
|---|---|---|---|
| 7,614,050 B2 | 11/2009 | Sasaki et al. | |
| 8,015,219 B2 | 9/2011 | Higuchi et al. | |
| 8,082,407 B1* | 12/2011 | Chatterjee et al. | 711/162 |
| 2006/0184936 A1 | 8/2006 | Abels et al. | |
| 2007/0271561 A1* | 11/2007 | Winner et al. | 718/1 |
| 2008/0104588 A1 | 5/2008 | Barber et al. | |
| 2008/0133208 A1* | 6/2008 | Stringham | 703/20 |
| 2008/0271017 A1* | 10/2008 | Herington | 718/1 |
| 2009/0106748 A1* | 4/2009 | Chess et al. | 717/168 |
| 2009/0292737 A1* | 11/2009 | Hayton | 707/200 |

(Continued)

FOREIGN PATENT DOCUMENTS

| | | |
|---|---|---|
| JP | 2005-292922 | 10/2005 |
| JP | 2009-230655 | 10/2009 |
| JP | 2010-102479 | 5/2010 |

OTHER PUBLICATIONS

PCT International Search Report and Written Opinion on application PCT/JP2012/002008 mailed Sep. 21, 2012; 13 pages.

*Primary Examiner* — Emerson Puente
*Assistant Examiner* — Dong Kim
(74) *Attorney, Agent, or Firm* — Foley & Lardner LLP

(57) ABSTRACT

In a computer system composed of a computer in which a plurality of VMs (Virtual Machines) are operated and a storage system, when a patch of an OS in the VM is applied, update data accompanying the application of the patch is stored in each VM image, causing increase of load of the storage system accompanying the concentration of read requests and the elongation of the patch applying process time. Therefore, the present invention provides a high-speed patch applying method to the VMs. When a patch applying request from a user using the VM is received and a patch is applied to the first VM, the patch is applied after creating a replication of the original GI (Golden Image) by which a new GI is created, and the new GI is used when the patch is applied to the second and subsequent VMs. During a patch applying process of the VM, a VM image is created from a new GI, and a path information related to the VM image is changed to thereby execute the patch applying process.

9 Claims, 15 Drawing Sheets

(56) References Cited

U.S. PATENT DOCUMENTS

2010/0153617 A1* 6/2010 Miroshnichenko et al. ...... 711/6
2010/0287544 A1* 11/2010 Bradfield et al. ............. 717/172
2010/0299309 A1* 11/2010 Maki et al. ................... 707/640
2011/0126275 A1* 5/2011 Anderson et al. ................ 726/8
2011/0252278 A1* 10/2011 Kanno et al. ................ 714/38.1
2011/0320882 A1* 12/2011 Beaty et al. ..................... 714/45
2012/0089972 A1* 4/2012 Scheidel et al. .............. 717/168
2013/0117744 A1* 5/2013 Klein et al. ...................... 718/1

* cited by examiner

Fig. 5

| VM_ID | STORAGE_ID | PORT_ID | LUN |
|---|---|---|---|
| 1 | 1 | 1 | 1 |
| 2 | 1 | 1 | 2 |
| 3 | 1 | 2 | 1 |
| 4 | 1 | 2 | 2 |
| 5 | 2 | 1 | 1 |
| 6 | 2 | 1 | 2 |

Fig. 6

| VOLUME_ID | SIZE | PORT_ID | LUN |
|---|---|---|---|
| 1 | 1 TB | 1 | 1 |
| 2 | 1 TB | 1 | 2 |
| 3 | 1 TB | 1 | 3 |
| 4 | 1 TB | 1 | 4 |
| 5 | 1 TB | 2 | 1 |
| 6 | 1 TB | 2 | 2 |

Fig. 7

| GI_ID | PARENT_ID | SIZE | CREATION_TIME | USAGE |
|---|---|---|---|---|
| 1 | - | 10 GB | 2010/04/01 12:00:00 | OS1 |
| 2 | 1 | 10 GB | 2010/07/01 12:00:00 | OS1+Patch1 |
| 3 | 2 | 10 GB | 2010/10/01 12:00:00 | OS1+Patch2 |
| 4 | 3 | 10 GB | 2011/01/01 12:00:00 | OS1+Patch3 |
| 5 | 4 | 10 GB | 2011/04/01 12:00:00 | OS1+Patch4 |
| 6 | 5 | 10 GB | 2011/07/01 12:00:00 | OS1+Patch5 |

Fig. 8

| IMAGE_ID | GI_ID | CREATION_TIME | HOST_ID | VM_ID |
|---|---|---|---|---|
| 101 | 7 | 2011/07/01 12:05:00 | 1 | 1 |
| 102 | 7 | 2011/07/01 12:10:00 | 1 | 2 |
| 103 | 6 | 2011/04/01 12:05:00 | 1 | 3 |
| 104 | 6 | 2011/04/02 12:00:00 | 1 | 4 |
| 105 | 6 | 2011/04/01 12:10:00 | 2 | 1 |
| 106 | 6 | 2011/04/01 18:00:00 | 2 | 2 |

Fig.11

| IMAGE_ID | DIFFERENCE_DATA |
|---|---|
| 101 | NO |
| 102 | NO |
| 103 | YES |
| 104 | NO |
| 105 | YES |
| 106 | NO |

Fig.15

| IMAGE_ID | PECULIAR_PATCH |
|---|---|
| 101 | - |
| 102 | - |
| 103 | 1001,1002,1003 |
| 104 | - |
| 105 | 1004 |
| 106 | - |

PATCH APPLYING METHOD FOR VIRTUAL MACHINE, STORAGE SYSTEM ADOPTING PATCH APPLYING METHOD, AND COMPUTER SYSTEM

TECHNICAL FIELD

The present invention relates to a patch applying method for applying patches to VMs (virtual machines) in a computer system composed of a computer in which a plurality of VMs operate and a storage system.

BACKGROUND ART

There have recently been disclosed techniques related to speedily deploying a system by creating a replication of OS (Operating System) images or VM images including the OS, and starting the system based on the created OS images or VM images.

For example, a deployment technique capable of distributing OS images at high speed is disclosed in patent literature 1, and a deployment technique capable of distributing VM images at high speed is disclosed in patent literature 2.

Further, a technique related to efficiently updating the data stored in an updatable snapshot is disclosed in patent literature 3.

Recently, a technique is proposed for starting a system based on an OS image stored in a read only media such as a CD-ROM or a DVD-ROM so as to enable operation without installing the system. According to the art, only the OS image is stored in a virtual volume of the VM, which will be a read only volume if no patch is applied, and difference data occurs only when a patch is applied. Furthermore, peculiar setting information and data of each VM is stored in a logical volume that differs from the OS image.

CITATION LIST

Patent Literature

PTL 1: Japanese Patent Application Laid-Open Publication No. 2005-292922 (Corresponding U.S. Pat. No. 7,614,050)
PTL 2: Japanese Patent Application Laid-Open Publication No. 2009-230655
PTL 3: Japanese Patent Application Laid-Open Publication No. 2010-102479 (Corresponding U.S. Pat. No. 8,015,219)

SUMMARY OF INVENTION

Technical Problem

In order to deploy the VM speedily using an updatable snapshot, a VM image is created by creating a snapshot of the GI (Golden Image) prepared as template. When VM images are created using this updatable snapshot, update data is stored in each VM image accompanying the generation of update data of each VM image.

Therefore, by adopting a patch of the OS in the VM, update data accompanying the patch application will be stored in each VM image, according to which drawbacks occur such as the increase of load of the storage system accompanying the concentration of write requests and the elongation of the patch applying process time caused by the increase of load. Patent literatures 1 and 2 disclose techniques related to the initial deployment of the system, but they do not teach techniques related to solving the increase of load of the storage system accompanying the application of a patch that occurs after deployment or the elongation of the patch applying process time. Similarly, patent literature 3 discloses a technique related to updating the snapshot data efficiently, but does not consider the application of a patch to the OS as source file, and therefore, patent literature 3 has the same drawbacks as patent literatures 1 and 2.

In order to solve the problems mentioned above, the present invention provides a technique for preventing the increase of load of the storage system during patch application and reducing the load further so as to apply the patch speedily to the VM.

Solution to Problem

The present invention provides a patch applying program for receiving the patch applying request from the user using the VM and executing a patch applying process, and a patch applying helper program for communicating with the patch applying program and realizing the patch applying process via management control regarding the storage system. Through execution of the patch applying helper program, a replication of the original GI is created when applying a patch to the first VM during the patch applying process, and a new GI is created by applying the patch. Then, the new GI is used for applying the patch to the second and subsequent VMs.

The actual method for solving the problem is to execute the patch applying process by creating a VM image from the new GI during the patch applying process to the VM and changing the path information associated with the VM image.

More specifically, the invention provides a storage system coupled to a computer in which a plurality of virtual computers are operated and comprising a controller and a plurality of memory devices, or a computer system composed of a computer and a storage system, or a patch applying method in a storage system or a computer system, wherein the storage system is configured to store OS data in a first volume provided by the plurality of memory devices, and provide a plurality of first virtual volumes to which the first volume is allocated, and wherein the plurality of virtual computers being operated using any one of OS images provided by each of the plurality of first virtual volumes, and wherein the controller is configured to create a replication of the first volume storing the OS data when a patch applying request is received from the computer to at least two or more first virtual computers, create a second volume by applying a patch having received the patch applying request to the replicated volume, generate a plurality of second virtual volumes to which the second volume is allocated, and switch the allocation of each of the first virtual computers from the first virtual volumes to the second virtual volumes.

Advantageous Effects of Invention

According to the present invention, it becomes possible to reduce the load of the storage system caused by the concentrated write requests when applying a patch to the VMs, and to cut down the time required for the patch applying process.

BRIEF DESCRIPTION OF DRAWINGS

FIG. 5 is a view showing a VM configuration information of the host computer.

FIG. 6 is a view showing a volume configuration information of the storage system.

FIG. 7 is a view showing a GI configuration information of the storage system.

FIG. 8 is a view showing the VM image configuration information of the storage system.

FIG. 11 is a view showing a VM image difference information of the storage system.

FIG. 15 is a view showing a VM image peculiar patch information of the storage system.

DESCRIPTION OF EMBODIMENTS

Figure 1:
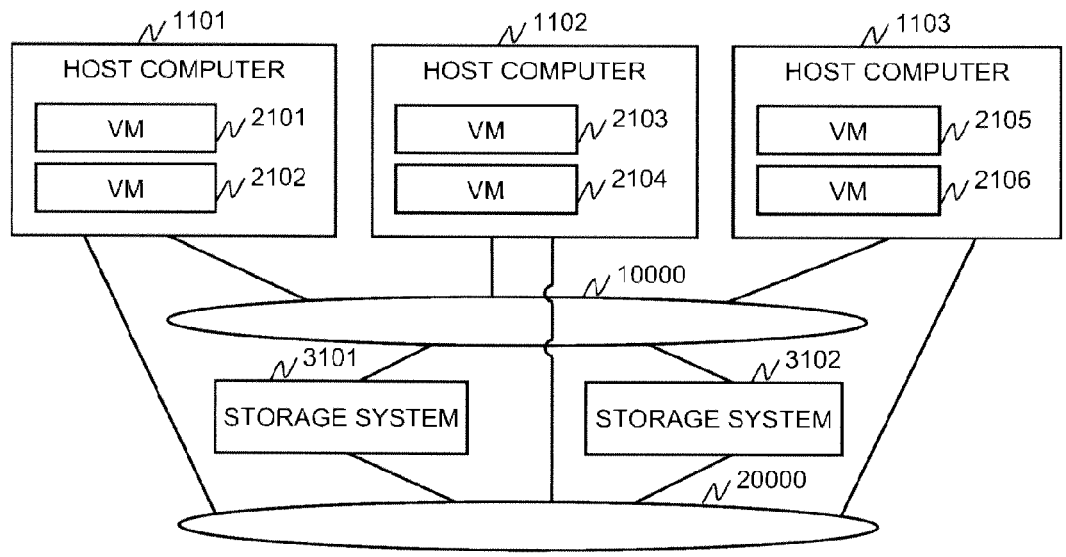
FIG. 1 is a view showing the configuration of a computer system according to embodiment 1.

Now, the preferred embodiments of the present invention will he described with reference to the drawings. In the description, various information are referred to as "management table", but the various information can be expressed via data structures other than tables. Further, the "management table" can also be referred to as "management information" to show that the information does not depend on the data structure.

The processes are sometimes described using the term "program" as the subject. The program is executed by a processor such as a MP (Micro Processor) or a CPU (Central Processing Unit) for performing determined processes. A controller can also be the subject of the processes since the processes are performed using appropriate storage resources (such as memories) and communication interface devices (such as communication ports). The controller can also use dedicated hardware in addition to the CPU. The computer program can be installed in each computer from a program source. The program source can be provided via a program distribution server or a storage media, for example.

Each element, such as a HDD or a controller, can be identified via numbers, but other types of identification information such as names can be used as long as they are identifiable information. The equivalent elements are provided with the same reference numbers in the drawings and the description of the present invention, but the present invention is not restricted to the present embodiments, and other modified examples in conformity with the idea of the present invention are included in the technical scope of the present invention. The number of each component can be one or more than one unless defined otherwise.

<Embodiment 1>

A patch applying method to a VM that does not consider the difference data that the VM has will be described with reference to FIGS. 1 through 9. FIG. 1 is a view showing a configuration of a computer system according to embodiment 1. The computer system according to the first embodiment is composed of one or more host computers and one or more storage systems.

FIG. 1 comprises three host computers 1101 through 1103 and two storage systems 3101 and 3102 as a configuration example. The host computer 1101 through 1103 are coupled to the storage systems 3101 and 3102 via a storage network 10000 and a network 20000.

VMs 2101 through 2106 operate in the host computers 1101 through 1103. Image files of VMs 2101 through 2106 are stored in the storage systems 3101 and 3102. The host computers 1101 through 1103 read the image files respectively corresponding to VMs 2101 through 2106 from either one of the storage systems 3101 and 3102 via the storage network 10000, and execute the respective VMs. The management operation of the host computers 1101 through 1103 and the storage systems 3101 and 3102 is executed via the network 20000 by a management terminal (not shown).

Figure 2:
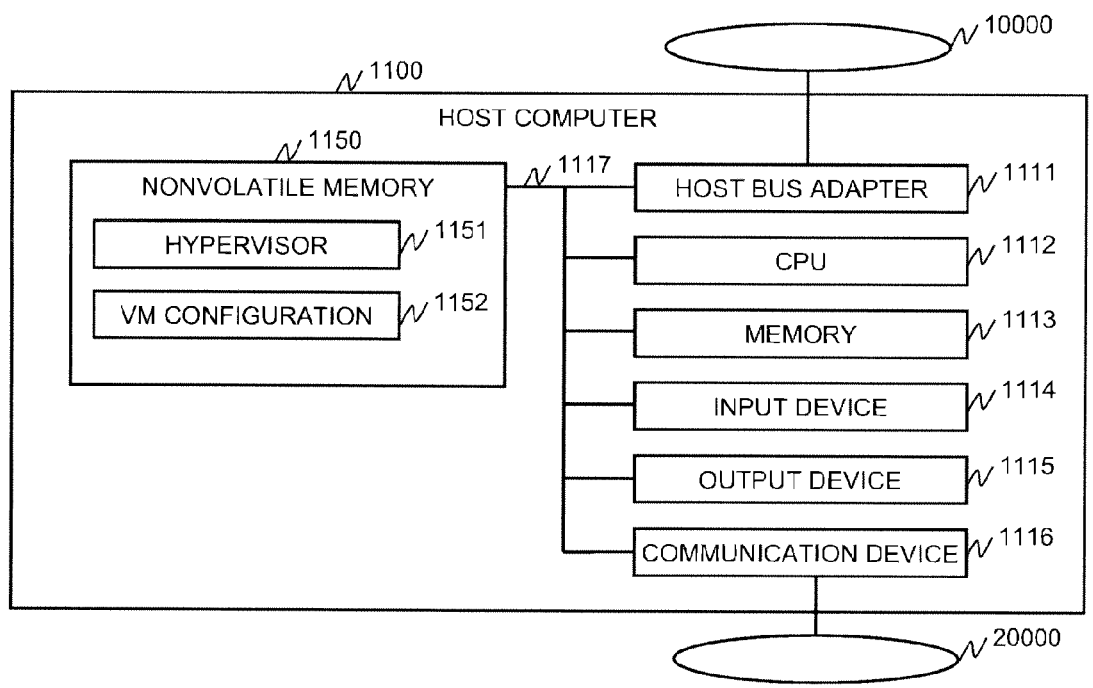
FIG. 2 is a view showing a detailed configuration of a host computer according to embodiment 1.

FIG. 2 is a view showing the detailed configuration of the host computer 1100 according to embodiment 1. The host computer 1100 (host computers 1101 through 1103 in FIG. 1) is composed of physical resources such as a host bus adapter 1111, a CPU 1112, a memory 1113, an input device 1114, an output device 1115, a communication device 1116 and a nonvolatile memory 1150. The physical resources are coupled via a system bus 1117. The host bus adapter 1111 is coupled to the storage network 10000 and performs I/O processing associated with the storage system. Only one host bus adapter 1111 is illustrated in FIG. 2, but there may be a plurality of host bus adapters disposed within the host computer 1100.

The CPU 1112 loads the program stored in the nonvolatile memory 1150 or the like in the memory 1113, and executes the commands stated in the program. Hereafter, the execution of the commands stated in the program by the CPU is referred to as the execution of a program. It is possible to have a plurality of CPUs 1112. The memory 1113 is used to load the program stored in the nonvolatile memory 1150 or the like and to store the data created when the program is executed. There is only one memory 1113 illustrated in FIG. 2, but it is possible to have a plurality of memories disposed within the host computer 1100.

The input device 1114 refers to a device for receiving input from a user, such as a keyboard, a mouse, a touch panel, a voice input device and so on. It is possible to have a plurality of input devices 1114 within the host computer 1100. The output device 1115 refers to a device for displaying or notifying an output to a user, such as a display device, a printer, a voice output device and so on. It is possible to have a plurality of output devices 1115 within the host computer 1100. The communication device 1116 is coupled to a network 20000, transmitting demands to execute management operation associated with the storage system or receiving demands to execute management operation associated with the host computer from the storage system. There is only one communication device 1116 illustrated in FIG. 2, but it is possible to have a plurality of communication devices disposed within the host computer 1100.

The nonvolatile memory 1150 stores, in addition to data and programs including an OS required for the operation of the host computer 1100, a hypervisor 1151 and a VM configuration information 1152. The hypervisor 1151 is a program for operating one or more VMs in the host computer. and the resource management of the VM is performed by distributing the physical resources such as the CPU 1112 and the memory 1113 to the respective VMs or by virtualizing the physical devices so that it can be shared among the VMs. The VM configuration information 1152 stores the configuration information including the relationship between the VM and the VM image operating in the host computer 1100. The VM configuration information 1152 will be described in detail later.

Figure 3:
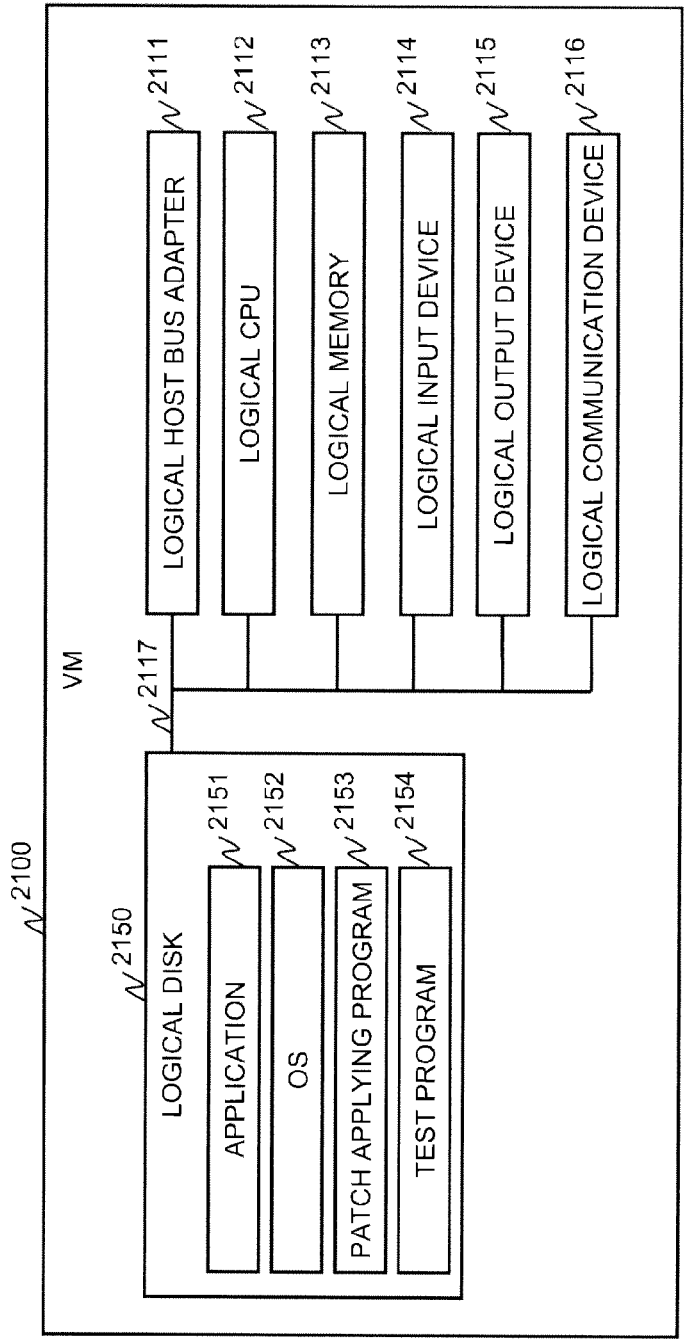
FIG. 3 is a view showing a detailed configuration of a VM according to embodiment 1.

FIG. 3 is a view showing a detailed configuration of a VM 2100 according to embodiment 1. The VM 2100 (VMs 2101 through 2106 of FIG. 1) operating in a host computer 1100 is composed of physical resources such as a logical host bus adapter 2111, a logical CPU 2112, a logical memory 2113, a logical input device 2114, a logical output device 2115, a logical communication device 2116 and a logical disk 2150. The logical resources are coupled via a system bus 2117.

The logical host bus adapter 2111 refers to a logical host bus adapter assigned to VMs 2101 through 2106 from the hypervisor 1151 of host computer 1100. The logical host bus adapter 2111 is coupled to the storage network 10000 via the host bus adapter 1111 of the host computer 1100. Through this coupling, the VM 2100 performs the I/O processing associated with the storage system by coupling to the storage network 10000 via the logical host bus adapter 2111 and the host bus adapter 1111. Only one logical host bus adapter 2111 is illustrated in FIG. 3, but it is possible to have a plurality of logical host bus adapters disposed within the VM 2100.

The logical CPU 2112 represents a logical CPU allocated to VMs 2101 through 2106 from the hypervisor 1151 of the host computer 1100. The logical CPU 2112 loads the program stored in the logical disk 2150 or the like to the logical memory 2113 and executes the commands stated in the program. Similar to the aforementioned physical CPU, the execution of the commands stated in the program by the logical CPU is referred to as the execution of a program. Only one logical CPU 2112 is illustrated in FIG. 3, but it is possible to have a plurality of logical CPUs disposed within the VM 2100.

The logical memory 2113 represents a logical memory assigned to the VMs 2101 through 2106 from the hypervisor 1151 of the host computer 1100. The logical memory 2113 is used to load the program stored in the logical disk 2115 and so on and the storage of the data created when executing the program. Only one logical memory 2113 is illustrated in FIG. 3, but it is possible to have a plurality of logical memories disposed within the VM 2100.

The logical input device 2114 represents a logical input device assigned to the VMs 2101 through 2106 from the hypervisor 1151 of the host computer 1100. The logical input device 2114 refers to a device for receiving input from the user, such as a keyboard, a mouse, a touch panel, a voice input device and so on. Only one logical input device 2114 is illustrated in FIG. 3, but it is possible to have a plurality of logical input devices disposed within the VM 2100.

The logical output device 2115 represents a logical output device assigned to the VMs 2101 through 2106 from the hypervisor 1151 of the host computer 1100. The logical output device 2115 represents a device for displaying an output to the user, such as a display device, a printer, a voice output device and so on. Only one logical output device 2115 is illustrated in FIG. 3, but it is possible to have a plurality of logical output devices disposed within the VM 2100.

The logical communication device 2116 represents a logical communication device assigned to the VMs 2101 through 2106 from the hypervisor 1151 of the host computer 1100. The logical communication device 2116 is coupled to the network 20000 via the communication device 1116, transmitting a request to execute a management operation associated with the storage system and receiving a request to execute a management operation with respect to the VMs 2101 through 2106 from the storage system. Only one logical communication device 2116 is illustrated in FIG. 3, but it is possible to have a plurality of logical communication devices disposed within the VM 2100.

The logical disk 2150 stores a patch applying program 2153 and a test program 2154 in addition to the data and programs including the application 2151 and the OS 2152 required for the operation of the VM 2100.

The patch applying program 2153 is a program for applying a patch to the OS 2152 in response to the request from a user using the VM 2100. The patch applying program 2153 executes a patch applying process is executed by communicating with a patch applying helper program mentioned later. The patch applying program 2153 is illustrated as a program stored in the VM 2100 according to the present embodiment, but it can be a program stored in the OS 2152 or a program operated in the host computer coupled via a network.

The test program 2154 is a program for confirming the operation of the application 2151 and the OS 2152. The test program 2154 executes a sequence of functions provided by the application 2151 and the OS 2152, compares the actual output values with expected values determined in advance, and if all the output values correspond to the expected values, determines that normal operation is performed. The functions provided by the application 2151 and the OS 2152 are executed by executing commands in a command line interface or programs using an API (Application Program Interface) provided by the application 2151 and the OS 2152. If the expected values depend on the environment such as the hardware configuration of the system, the expected values corresponding to the environment are computed. It is also possible to use the operation confirmation program installed in the application 2151 or the OS 2152 as the test program 2154. Further, it is possible to use an operation confirmation program created by the user as the test program 2154 for testing a set of functions used for operation.

Figure 4:
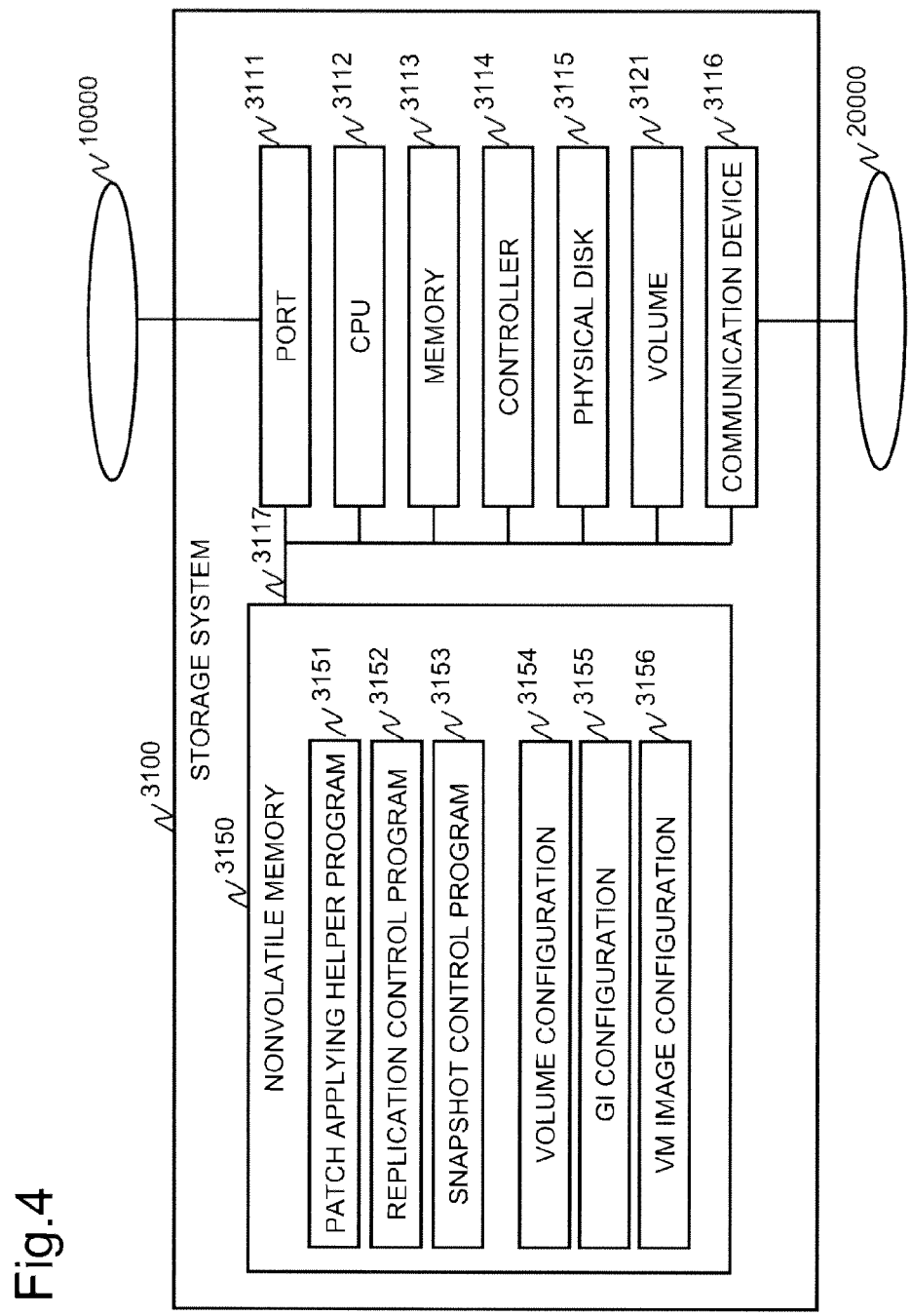
FIG. 4 is a view showing a detailed configuration of a storage system according to embodiment 1.

FIG. 4 is a view showing the detailed configuration of a storage system 3100 according to the first embodiment. The storage system 3100 (storage systems 3101 and 3102 in FIG. 1) is composed of physical resources such as a port 3111, a CPU 3112, a memory 3113, a controller 3114, a physical disk 3115, a communication device 3116 and a nonvolatile memory 3150. The physical resources are coupled via a system bus 3117. The storage system 3100 provides logical resources including a volume 3121. composed of physical resources such as the physical disk 3115 and the nonvolatile memory 3150 to the host computers 1101 through 1103 and the like.

The port 3111 is coupled to the storage network 10000 and performs processes regarding the I/O requests sent from the host computer 1100 and the VM 2100. Only one port 3111 is illustrated in FIG. 4, but it is possible to have a plurality of ports disposed within the storage system 3100.

The CPU 3112 loads the program stored in the nonvolatile memory 3150 and the like to the memory 1113, and executes the commands stated in the program. Only one. CPU 3112 is illustrated in FIG. 4, but it is possible to have a plurality of CPUs disposed within the storage system 3100.

The memory 3113 can be used to load programs stored for example in the non-volatile memory 3150 or to store data generated when executing a program. Only one memory 3113 is illustrated in FIG. 4, but it is possible to have a plurality of memories disposed within the storage system 3100.

The controller 3114 manages resources such as the CPU 3112, the memory 3113 and the communication device 3116 within the storage system 3100 and controls the port 3111, the physical disk 3115 and so on. Only one controller 3114 is illustrated in FIG. 4, but it is possible to have a plurality of controllers disposed within the storage system 3100, or the controller can be designed as multiple devices performing various processes depending on the different control targets such as the port and the disk.

The physical disk 3115 is used to store application programs and data. Only one physical disk 3115 is illustrated in FIG. 4, but a plurality of physical disks 3115 can be disposed in the storage system 3100 having redundancy and constituting a virtual disk. A RAID (Redundant Array of Inexpensive Disks) structure is a typical example of physical disks having redundancy, but the structure can he other than the RAID structure.

The communication device 3116 is coupled to the network 20000 to receive requests from the host computer and the VMs for executing a management operation of the storage system, and to send requests to the host computer or the VMs to execute the management operation. Only one communication device 3116 is illustrated in FIG. 4, but a plurality of communication devices can he disposed within the storage system 3100.

The volume 3121 provides a storage area for storing data of the host computer and the VMs or the image file of the VMs. The entity of the storage area provided by the volume 3121 is allocated from the physical disk 3115.

The nonvolatile memory 3150 stores, in addition to the data and programs including the OS required for the operation of the storage system 3100, a patch applying helper program 3151, a replication control program 3152, a snapshot control program 3153, a volume configuration information 3154, a GI configuration information 3155 and a VM image configuration information 3156.

The patch applying helper program 3151 is a program for performing communication with the aforementioned patch applying program 2153 and for helping the patch application with respect to the VMs. Further, the patch applying helper program 3151 executes a volume replication control program 3152 upon creating a replication of the volume 3121, and executes a snapshot control program 3153 upon creating a snapshot of the volume 3121.

The patch applying helper program 3151 is illustrated as a program operating in the storage system 3100, but it can also be a program operating in the host computer or a management computer coupled thereto via the network.

The replication control program 3152 is a program for controlling the replication of the volume 3121. Replication control includes creating, deleting and changing the status of the replication. The replication can be executed by copying the data of the replication source volume to a replication destination volume, or can be executed by creating a virtual volume composed of the replication source volume data and the update data associated with the replication destination volume.

The snapshot control program 3153 is a program for controlling the snapshot of the volume 3121. Snapshot control includes creating, deleting and changing the status of the snapshot. The snapshot is realized by creating a virtual volume composed of the data of the volume as the snapshot source and an update data regarding the snapshot destination volume. The update data related to the snapshot destination volume is stored in the physical disk 3115 within the storage system 3100 or in the pool area composed of the volume 3121.

The volume configuration information 3154 stores the configuration information of the volume 3121 in the storage system 3100 including the path information. The detailed description of the volume configuration information 3154 will be illustrated later. The GI configuration information 3155 stores the configuration information including the corresponding relationship between the creation source GI and the replication source GI. An example of a part of the GI configuration information 3155 will be illustrated later. The VM image configuration information 3156 stores the configuration information including the corresponding relationship between the VM image and the creation source GI. The detailed description of the VM image configuration information 3156 will be illustrated later.

FIG. 5 is a view showing a VM configuration information 1152 of the host computer 1100. The VM configuration information 1152 is composed of a VM_ID 11521, a STORAGE_ID 11522, a PORT_ID 11523 and a LUN 11524.

The VM_ID 11521 shows an identification information of the VM which is unique within the host computer 1100. The STORAGE_ID 11522 shows an identification information of the storage system 3100. The PORT_ID 11523 shows an identification information of the port 3111 in the storage system 3100 designated by the STORAGE_ID 11522.

The LUN 11524 shows a LUN associated with the image of the VM designated by the VM_ID, and it is unique with respect to the port 3111 designated by the STORAGE_ID 11522 and the PORT_ID 11523. The VM configuration information 1152 has one record added thereto when a VM is created and one record deleted therefrom when a VM is deleted.

FIG. 6 is a view showing a volume configuration information 3154 of the storage system 3100. The volume configuration information 3154 is composed of a VOLUME_ID 31541, a SIZE 31542, a PORT_ID 31543 and a LUN 31544.

The VOLUME_ID 31541 shows an identification information of a volume unique within the storage system 3100. The SIZE 31542 shows a size of the volume designated by the VOLUME_ID 31541. The PORT_ID 31543 shows an identification information of a port assigned to the volume designated by the VOLUME_ID 31541.

The LUN 31544 shows an identification information when accessing the volume designated by the VOLUME_ID 31541 from the port designated by the PORT_ID 31543. A plurality of PORT_IDs 31543 and a plurality of LUNs 31544 may exist with respect to a single VOLUME_ID 31541.

The volume configuration information 3154 has one record added when setting the port allocation regarding a volume and has one record deleted when cancelling the port allocation regarding a volume.

FIG. 7 is a view showing a GI (golden image) configuration information 3155 of the storage system 3100. The GI configuration information 3155 is composed of a GI_ID 31551, a PARENT_ID 31552, a SIZE 31553, a CREATION_TIME 31554 and a USAGE 31555.

The GI_ID 31551 shows a volume identification information of the GI unique within the storage system 3100. The PARENT_ID 31552 shows a volume identification information unique within the storage system 3100 of the GI (creation source GI) which is the source of the copied GI.

The SIZE 31553 refers to the size of the GI. The CREATION_TIME 31554 refers to the creation date and time of the GI. The USAGE 31555 shows the usage of the image included in the GI, including the patch information. The GI configuration information 3155 has one record added when creating a GI and one record deleted when deleting a GI.

FIG. 8 is a view showing a VM image configuration information 3156 of the storage system 3100. The VM image configuration information 3156 is composed of an IMAGE_ID 31561, a GI_ID 31562, a CREATION_TIME 31563, a HOST_ID 31564 and a VM_ID 31565.

The IMAGE_ID 31561 shows a volume identification information of the VM image that is unique within the storage system 3100. The GI_ID 31562 shows a volume identification information of the creation source GI of the VM image that is unique within the storage system 3100. The CREATION_TIME 31563 shows the date and time of creation of the VM image.

The HOST_ID 31564 shows the identification information of the host computer 1100 executing the VM image. The VM_ID 31565 shows an identification information unique within the host computer 1100 designated by the HOST_ID 31564 of the VM associated with the VM image. The VM image configuration information 3156 has one record added when creating a VM image and one record deleted when deleting a VM image.

Figure 9:
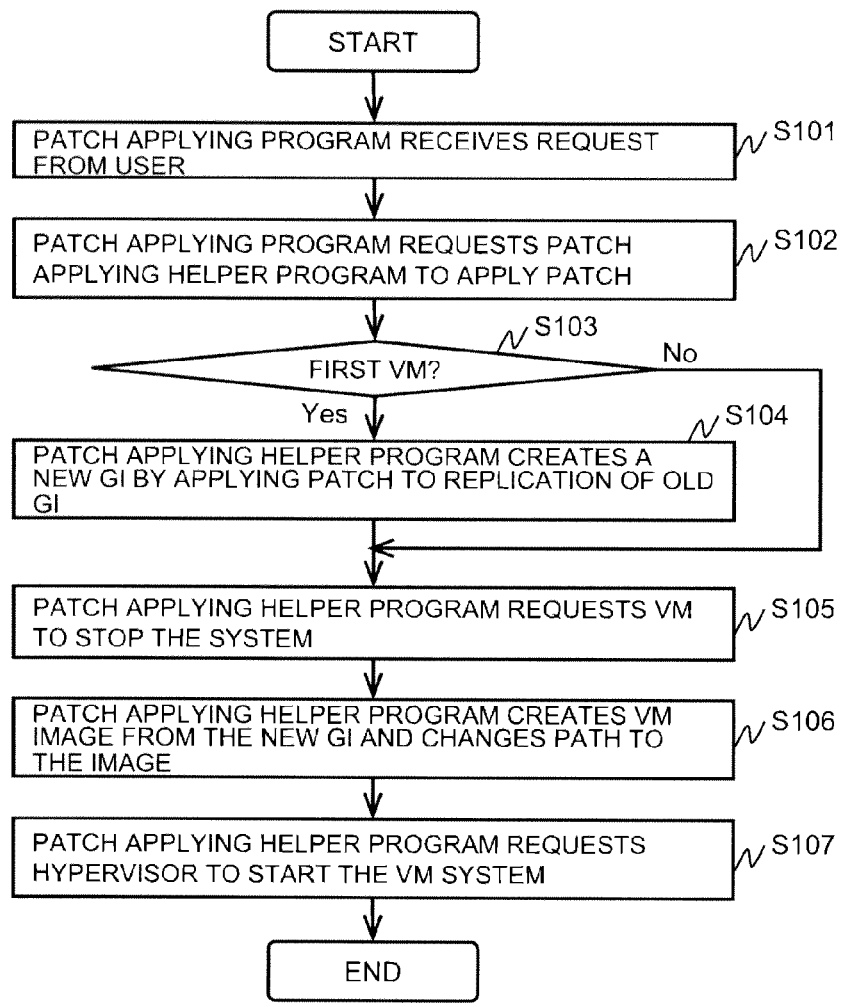
FIG. 9 is a view showing a flow of a patch applying process according to embodiment 1.

FIG. 9 is a view showing the flow of the patch applying process according to embodiment 1. Reference S denotes steps. The same applies to the whole description. When a user using the VM 2100 or a system administrator managing the computer system such as the storage system or the host computer (hereinafter referred to as system administrator) requests patch application, the following steps are executed.

At first, the patch applying program 2153 in the logical disk 2150 of the VM 2100 receives the patch application request from the user or the system administrator (step S101). Next, the patch applying program 2153 notifies the ordered patch application request to the patch applying helper program 3151 in the nonvolatile memory 3150 of the storage system 3100 (step S102).

Thereafter, the patch applying helper program 3151 determines whether the VM to which the patch is applied notified by the patch applying program 2153 is the first VM or not. Whether the VM is the first VM or not is determined based on whether a record including the notified patch exists in the USAGE 31555 of the GI configuration information 3155 of FIG. 7 or not.

Actually, the USAGE 31555 in which the GI_ID 31551 is "1" is the "OS", and it can be seen that a patch has not been applied. Similarly, the USAGE 31555 in which the GI_ID 31551 is "6" is "OS+Patch5", and it can be seen that Patch5 has been applied.

If the patch notified to the USAGE 31555 of the GI configuration information 3155 of FIG. 7 is "Patch5", it can be seen that the patch is an already applied patch, and so the VM is not the first VM to which the patch is applied. Further, if the patch notified to the USAGE 31555 is "Patch7", the patch does not exist in the GI configuration information 3155 of FIG. 7, so it can be recognized that the VM is the first VM to which the present patch is applied.

If there is no record including the patch notified to the USAGE 31555 of the GI configuration information 3155, the patch applying helper program 3151 determines that the VM to which the patch is applied is the first VM (step S103).

If the VM to which the patch is applied is the first VM (S103: Yes), the patch applying helper program 3151 advances the process to step S104. If the VM to which the patch is applied is not the first VM (S103: No), the patch applying helper program advances the process to step S105.

If the VM to which the patch is applied is the first VM (S103: Yes), the patch applying helper program 3151 orders creation of replication of an existing GI to the replication control program 3152. The replication of the existing GI can be realized by copying the data of the existing GI or can be a virtual volume composed of the data of the existing GI and update data. When the replication is created by copying an existing GI, a patch is applied to the copy destination volume and a new GI is created. When the replication is created by a virtual volume, a patch is applied to the created virtual volume and a new GI is created. As for the process of applying a patch to the copied GI, the patch applying helper program 3151 starts the hypervisor 1151 of the non-volatile memory 1150 of the host computer 1100, and creates a replication of the GI at first. After creating a replication of the GI, the patch applying helper program 3151 orders to apply a designated patch to the patch applying program 2153 in the copied GI (new GI) created by the hypervisor 1151, by which the patch application is realized (step S104).

Next, the patch applying helper program 3151 orders the patch applying program 2153 to stop the system of the VM to which the patch is applied (step S105). After stopping the system of the VM, the patch applying helper program 3151 creates a VM image from the new GI, updates the VM image configuration information 3156 of FIG. 8 (changing the corresponding relationship between the IMAGE_ID 31561 and the GI_ID 31562, and the CREATION_TIME 31563). and switches the path between the GI and the VM image (step S106). Lastly, the patch applying helper program 3151 orders to start the system of the VM having completed patch application to the hypervisor 1151, and completes the patch applying process (step S107).

As described, the patch applying process to the VM can be performed at high speed by the cooperation of the patch applying program in the VM and the patch applying helper program in the storage system. Thus, it becomes possible to prevent the increase of load of the storage system accompanying the concentrated write request and the elongation of processing time accompanying the increased load compared to the prior art technology in which a patch is applied to the VM image by acquiring a snapshot of the GI prepared as a template.

<Embodiment 2>

Next, a patch applying method to the VM considering the case where the VM stores difference data (second embodiment) will he described with reference to FIGS. 10 through 13. The computer system of the second embodiment is composed of one or more host computer 1100 and one or more storage systems 3100, similar to the computer system of the first embodiment. The host computer 1100 has a similar configuration as the computer system of the first embodiment, so the detailed description thereof will be omitted.

Figure 10:
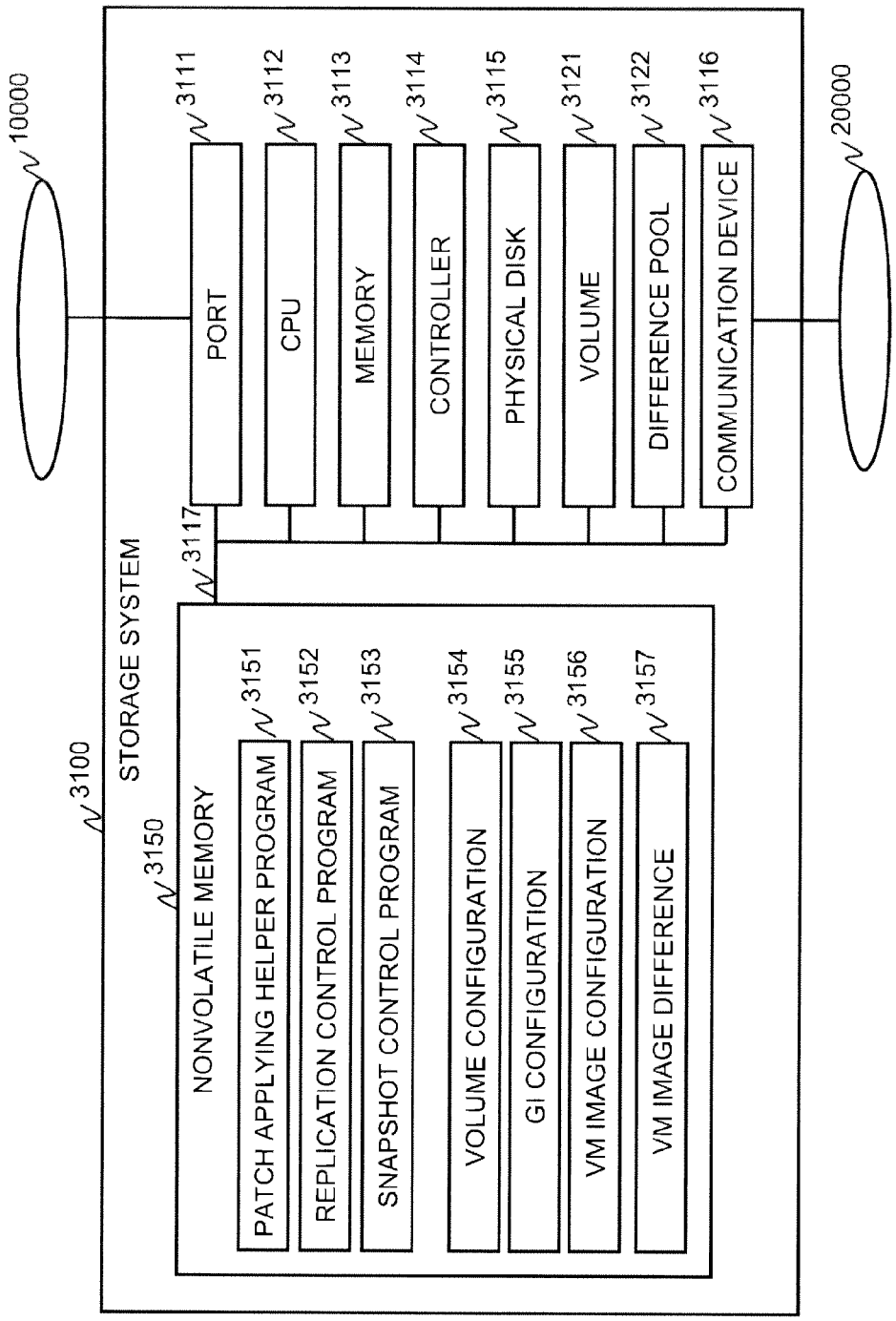
FIG. 10 is a view showing the detailed configuration of a storage system according to embodiment 2.

FIG. 10 is a view showing a detailed configuration of a storage system 3100 according to the computer system of the second embodiment. The storage system 3100 is composed of physical resources such as a port 3111, a CPU 3112, a memory 3113, a controller 3114, a physical disk 3115, a communication device 3116 and a nonvolatile memory 3150, and logical resources including a volume 3121 and a difference pool 3122. Regarding the components in the configuration of FIG. 10, the operations of components having the same reference numbers as those of FIG. 4 illustrating the first embodiment are the same, so the detailed description thereof are omitted.

A difference pool 3122 is a storage area for storing the difference data that occurs when a peculiar patch is applied in the VM 2100, which is composed of a physical disk 3115 and a volume 3121. A VM image difference information 3157 is newly stored in a nonvolatile memory 3150. The VM image difference information 3157 stores information including whether difference data exists or not with respect to the VM image.

FIG. 11 is a view showing the VM image difference information 3157 of the storage system 3100. The VM image difference information 3157 is composed of an IMAGE_ID 31571 and a DIFFERENCE_DATA 31572. The IMAGE_ID 31571 shows a volume identification information of the VM image unique within the storage system 3100. The DIFFERENCE_DATA 31572 shows whether difference data exists or not with respect to the VM image.

The VM image difference information 3157 has one record added thereto when creating a VM image and one record deleted when deleting a VM image. Further, when a difference data regarding a VM image occurs, the corresponding record is updated.

Figure 12A:
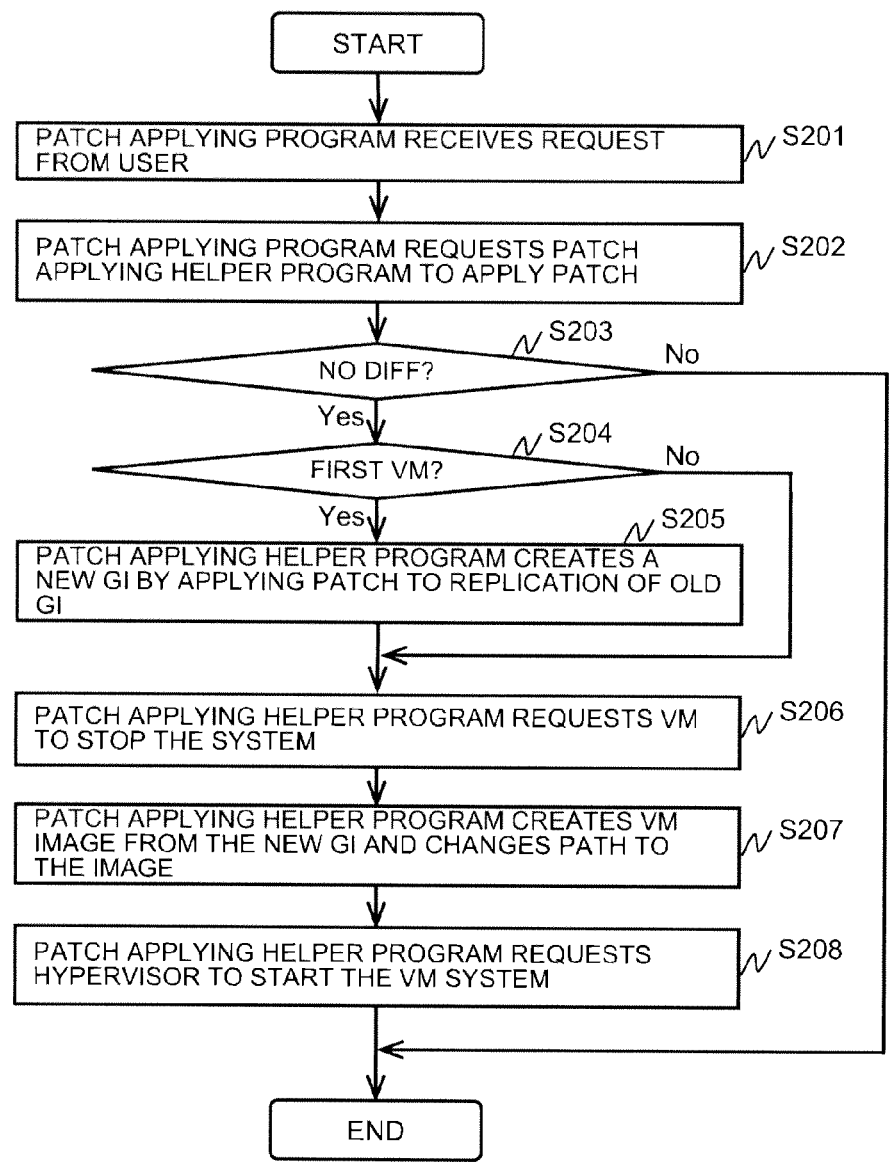
FIG. 12A is a view showing a flow of a first patch applying process according to embodiment 2.
Figure 12B:
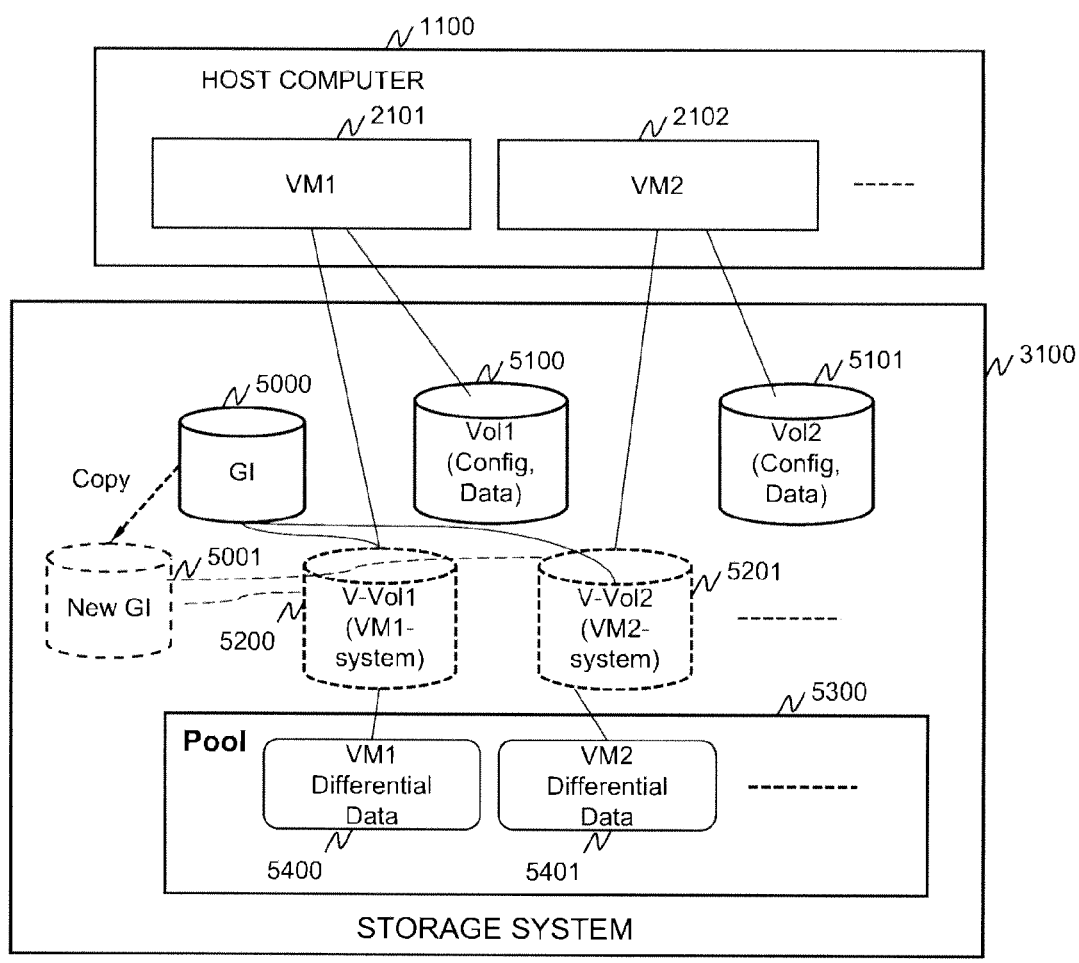
FIG. 12B is a view showing a relationship between a virtual volume in a VM and the difference data thereof.

FIG. 12A is a view showing the flow of the first patch applying process according to embodiment 2. FIG. 12B is a view showing the relationship between the virtual volume in the VM and the difference data thereof. With reference to FIGS. 12A and 12B, we will now describe the suppression of patch application to a VM considering the existence of the difference data according to the first patch applying process of embodiment 2. If the user or the system administrator and the like using the VM 2100 requests patch application, the following steps are executed.

At first, the patch applying program 2153 in the logical disk 2150 of the VM 2100 receives a patch application request instructed by the user or the system administrator (step S201). Next, the patch applying program 2153 notifies the requested patch application request to the patch applying helper program 3151 of the nonvolatile memory 3150 in the storage system 3100 (step S202).

Next, the patch applying helper program 3151 confirms whether difference data regarding the VM image of the VM to which the patch is applied exists or not by referring to the DIFFERENCE_DATA 31572 of the VM image difference information 3157 of FIG. 11. When difference data does not exist (when the DIFFERENCE_DATA 31572 is "No" as in the case of the IMAGE_ID "101") (S203: No), the patch applying helper program 3151 advances the process to step S204. When difference data exists (when the DIFFERENCE_DATA 31572 is "Yes" as in the case of the IMAGE_ID "103") (S203: Yes), the patch applying helper program 3151 ends the process without performing the patch applying operation (step S203).

The difference data is, for example, difference data 5400 and 5401 in FIG. 12B. Only the OS (GI 5000) image is stored in the virtual volume 5200 of VMs 2101 and 2102, and only when patch application is performed, difference data 5400 and 5401 occur in the pool 5300. The configuration information and data of each VM other than the OS image are stored in the logical volumes 5100 and 5101.

Next, the patch applying helper program 3151 determines whether the VM applying the patch notified from the patch applying program 2153 is a first VM or not. Whether the VM is the first VM or not is determined based on whether a record including the patch notified to the USAGE 31555 of the GT configuration information 3155 exists or not. If there is no record including the patch notified to the USAGE 31555 of the GI configuration information 3155, the patch applying helper program 3151 determines that the VM to which the patch is applied is the first VM (step S204). The process of step S204 is the same as the process of step S103 of FIG. 9.

Next, if the VM to which the patch is applied is the first VM (S204: Yes), the patch applying helper program 3151 advances the process to step S205. If the VM to which the patch is applied is not the first VM (S103: No), the patch applying helper program 3151 advances the process to step S206.

Thereafter, the patch applying helper program 3151 creates a new GI by starting the hypervisor 1151 in the nonvolatile memory 1150 of the host computer 1100 and applying a patch to the replication of the GI (step S205), similar to step S104 of FIG. 9. Next, the patch applying helper program 3151 requests the patch applying program 2153 to stop the system of the VM to which the patch is applied (step S206).

Next, the patch applying helper program 3151 creates a VM image from the new GI, updates the VM image configuration information 3156 of FIG. 8 (changes the corresponding relationship between the IMAGE_ID 31561 and the GI_ID 31562, and the CREATION_TIME 31563), and switches the path from the GI to the VM image (step S207). Lastly, the patch applying helper program 3151 requests the hypervisor 1151 to start the system of the VM to which the patch application has been completed, and completes the patch applying process (step S208).

Figure 13:
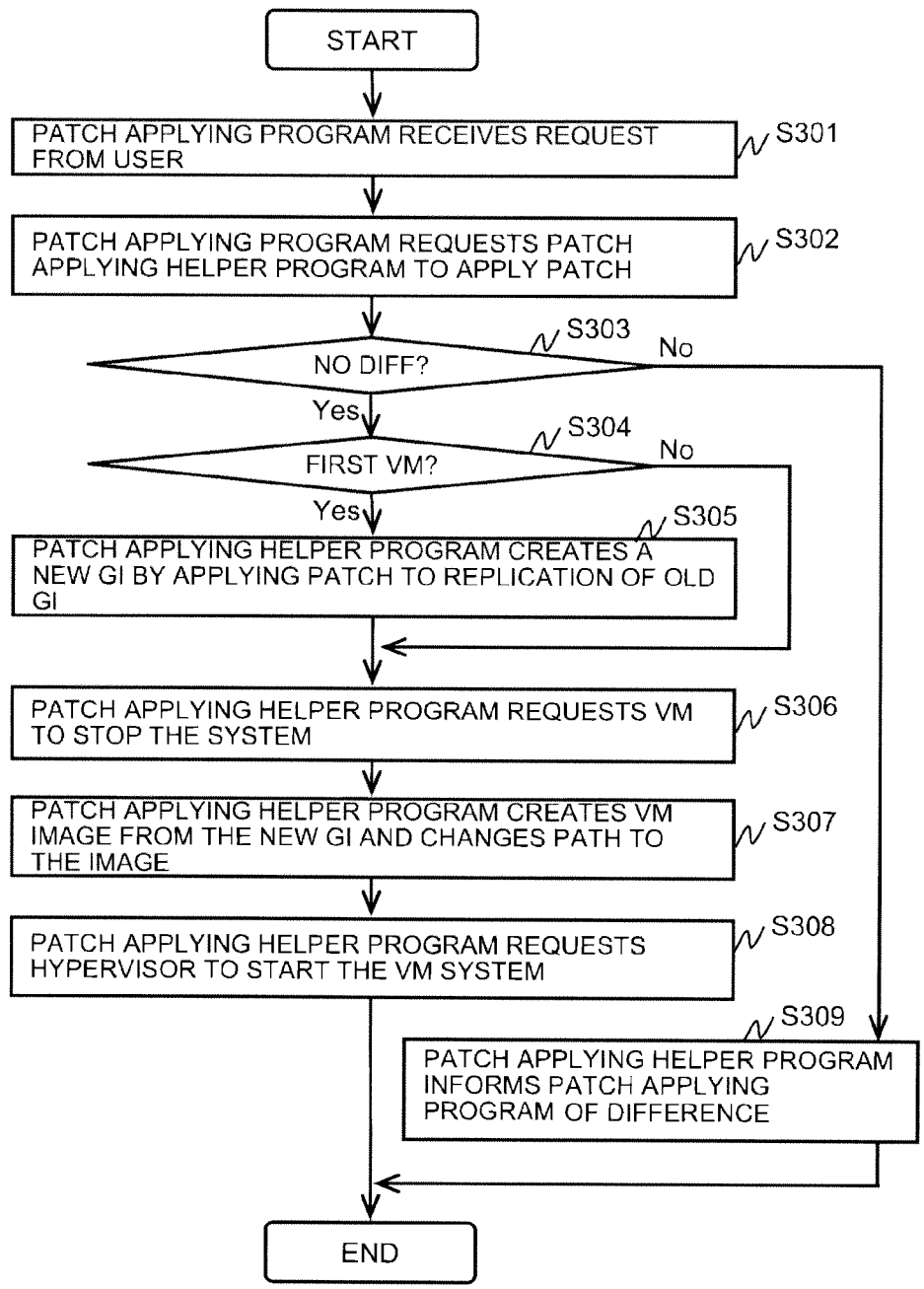
FIG. 13 is a view showing a flow of a second patch applying process according to embodiment 2.

FIG. 13 is a view showing the flow of the second patch applying process according to embodiment 2. Next, with reference to FIG. 13, the second patch applying process according to embodiment 2 will be described, related to suppressing the application of a path to a VM considering the presence of difference data and the notification on whether patch application is available or not. If a user or a system administrator and the like using the VM 2100 request patch application, the following steps are executed.

At first, the patch applying program 2153 receives a patch application request from a user or a system administrator (step S301). Then, the patch applying program 2153 notifies the received patch application request to the patch applying helper program 3151 (step S302).

The patch applying helper program 3151 confirms whether difference data related to the VM image of the VM to which the patch is applied exists or not by referring to the DIFFERENCE_DATA 31572 of the VM image difference information 3157 of FIG. 11. If no difference data exists (step S303: Yes), the patch applying helper program 3151 advances the process to step S304. If difference data exists (step S303: No), the patch applying helper program 3151 advances the process to step S309 (step S303). This process of step S303 is the same as the process of step S203 of FIG. 12A.

If difference data does not exist (step S303: Yes), the patch applying helper program 3151 determines whether the VM to which the patch is applied notified from the patch applying program 2153 is the first VM or not. The determination is performed by confirming whether there exists a record including the notified patch in the USAGE 31555 of the GI configuration information 3155 of FIG. 7. The process of step S304 is the same as the processes of step S103 of FIG. 9 and step S204 of FIG. 12A.

If there is no record including the notified patch in the USAGE 31555 of the GI configuration information 3155, the patch applying helper program 3151 determines that the VM to which the patch is applied is the first VM (step S304). If the VM is the first VM (step S304: Yes), the patch applying helper program 3151 advances the process to step S305. If the VM is not the first VM (step S304: No), the patch applying helper program 3151 advances the process to step S306.

If the VM is the first VM (step S304: Yes), the patch applying helper program 3151 creates a new GI by applying the patch to the replication of the GI (step S305). Then, the patch applying helper program 3151 request the patch applying program 2153 to stop the system of the VM to which the patch is applied (step S306).

Next, the patch applying helper program 3151 creates a VM image from the new GI, updates the VM image configuration information 3156 of FIG. 8 (changing the corresponding relationship between the IMAGE_ID 31561 and the GI_D 31562, and the CREATION_TIME 31563), and switches the path from the 61 to the VM image (step S307). Lastly, the patch applying helper program 3151 requests the hypervisor 1151 to start the system of the VM to which the patch application has been completed, and completes the patch applying process (step S308).

If the VM is not the first VM (step S304: No), the patch applying helper program 3151 notifies the user or the system administrator that the patch applying process is not performed since difference data exists in the patch applying program 2153, and completes the patch applying process (step S309).

As described, the patch applying process to the VM considering the possibility that the VM may have difference data can be performed at high speed through the co-operation of the patch applying program and the patch applying helper program. Thereby, similar to the first embodiment, the second embodiment enables to prevent the increase of load of the storage system accompanying the concentration of read requests and the elongation of the processing time accompanying the increase of load. Further, it becomes possible to not apply the patch when the VM has difference data and to notify that the patch has not been applied to the user or the system administrator, so that the usability is improved.

<Embodiment 3>

Now, a patch applying process according to a third embodiment of the present invention including a VM image peculiar patch applying process and a patch applying test process will be described with reference to FIGS. 14 through 17. The computer system according to the third embodiment of the present invention comprises, similar to the computer system of the second embodiment, one or more host computers 1100 and one or more storage systems 3100. Since the host computer IWO has the same configuration as the computer system of the second embodiment, the detailed description thereof is omitted.

Figure 14:
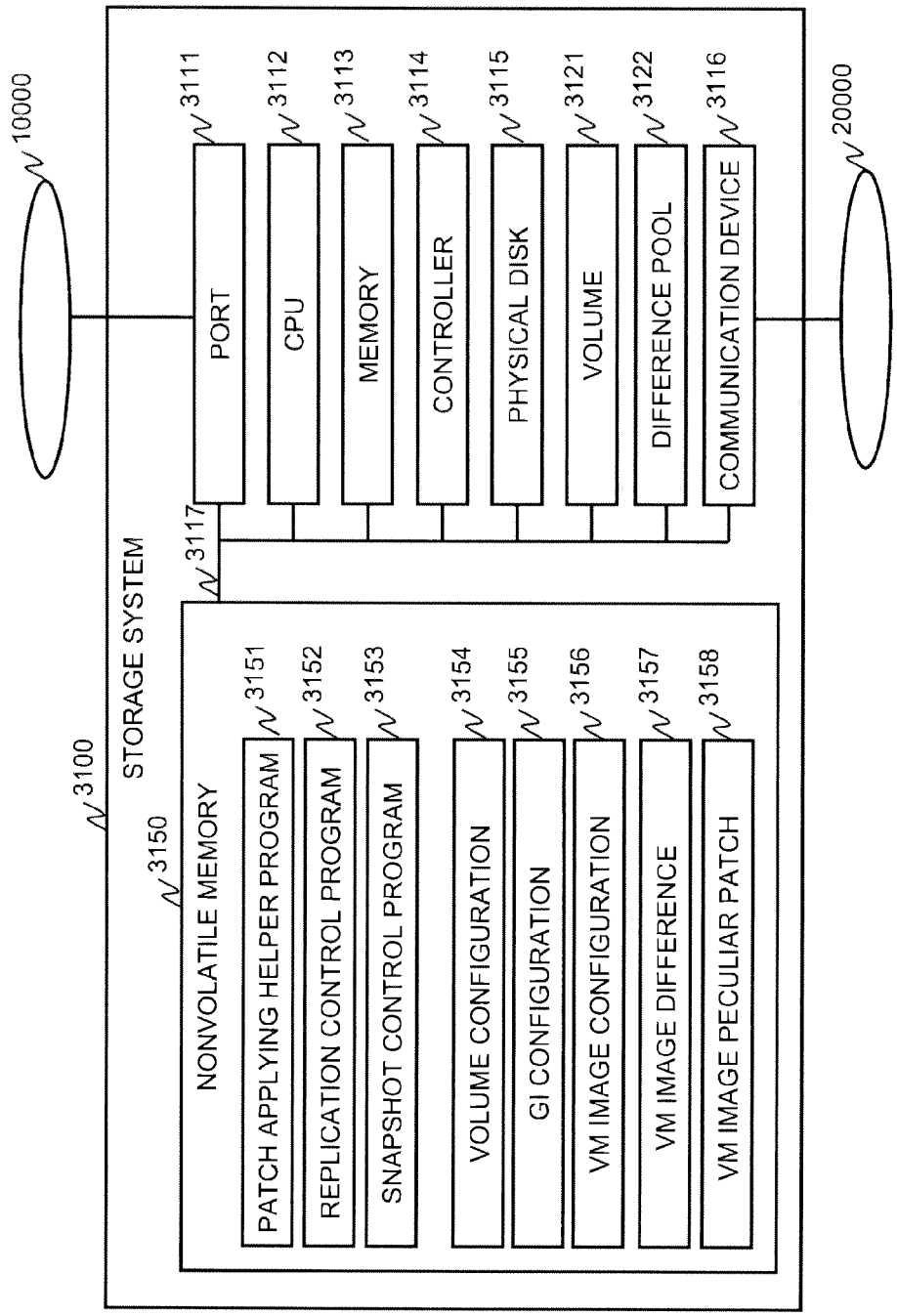
FIG. 14 is a view showing a detailed configuration of a storage system according to embodiment 3.

FIG. 14 is a view showing a detailed configuration of a storage system 3100 of a computer system according to the third embodiment of the present invention. The storage system 3100 is composed of, similar to the second embodiment, physical resources such as a port 3111, a CPU 3112, a memory 3113, a controller 3114, a physical disk 3115, a communication device 3116 and a nonvolatile memory 3150, and logical resources including a volume 3121 and a difference pool 3122. The components denoted by the same reference numbers as those in FIG. 10 of the second embodiments are equivalent, the detailed descriptions thereof are omitted.

A new VM image peculiar patch information 3158 is stored in the nonvolatile memory 3150. The VM image peculiar patch information 3158 stores the information of a peculiar patch applied to the VM image.

FIG. 15 is a view showing a VM image peculiar patch information 3158 of the storage system 3100. The VM image peculiar patch information 3158 is composed of an IMAGE_ID 31581 and a PECULIAR_PATCH 31582. The IMAGE_ID 31581 shows a volume identification information of the VM image unique within the storage system 3100.

The PECULIAR_DATA 31582 shows the identification information of all the peculiar patches applied to the VM image. If no peculiar patch exists, "-" is entered. Actually, the VM having an IMAGE_ID 31581 "101" does not have a peculiar patch, so the PECULIAR_DATA 31582 shows "-", and the VM having an IMAGE_ID 31581 "103" has a peculiar patch, so the peculiar patch information includes three values, "1001, 1002, 1003".

The VM image peculiar patch information 3158 has one record added when a VM image is created and one record deleted when a VM image is deleted. Further, when a peculiar patch is applied to the VM image, the corresponding record is updated. For example, if a peculiar patch "1005" is applied to the VM in which the IMAGE_ID 31581 is "106", the information of the corresponding PECULIAR_DATA 31582 is changed from "-" to "1005".

Figure 16:
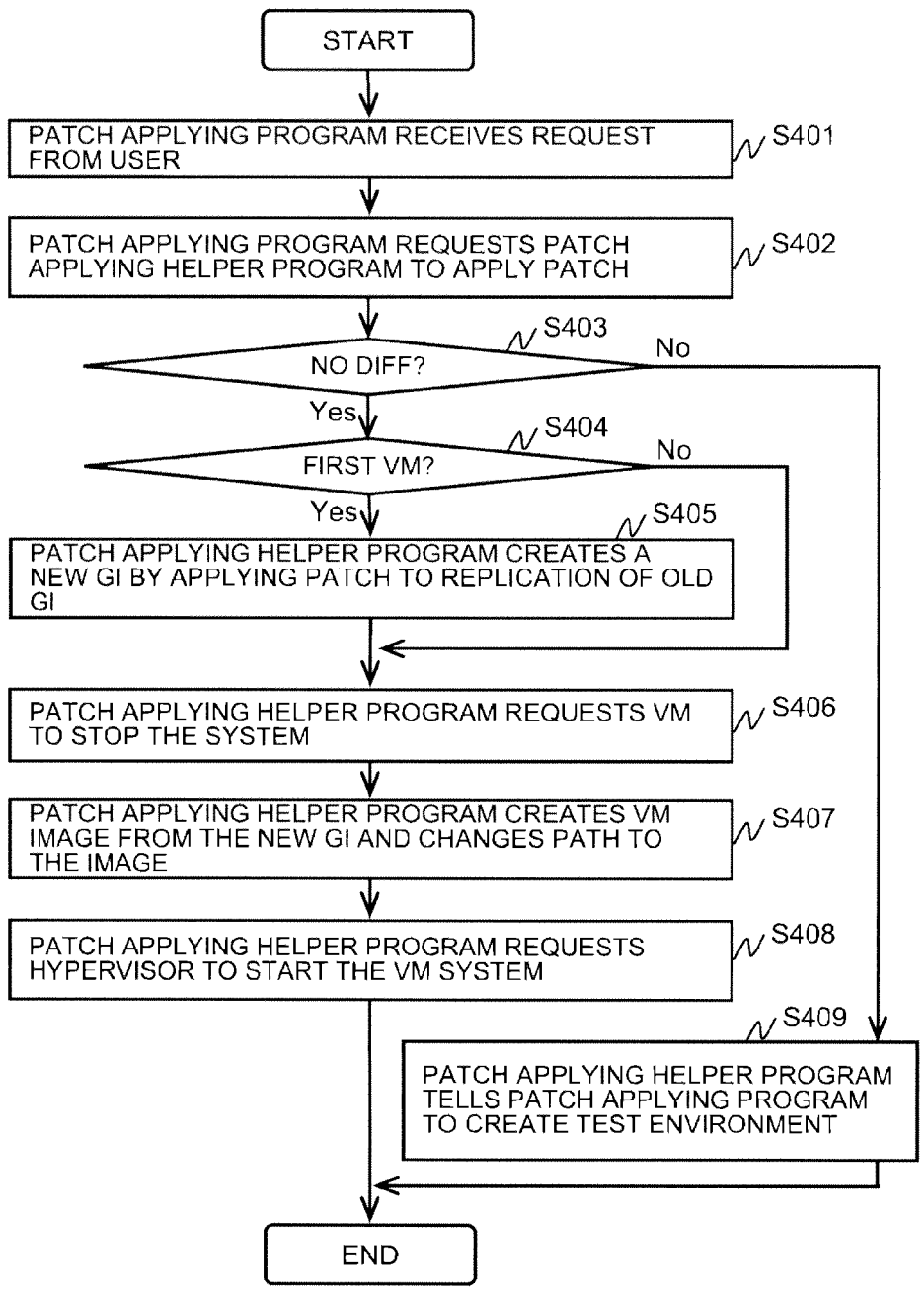
FIG. 16 is a view showing a flow of a patch applying process according to embodiment 3.

FIG. 16 is a view showing the flow of the patch applying process according to the third embodiment. When a user or a system administrator using the VM 2100 requests patch application, the following steps are executed.

At first, the patch applying program 2153 receives a patch application request from the user or the system administrator (step S401). Then, the patch applying program 2153 notifies the received patch application request to the patch applying helper program 3151 (step S402).

Next, the patch applying helper program 3151 confirms whether difference data related to the VM image of the VM to which the patch is applied exists or not by referring to the DIFFERENCE_DATA 31572 of the VM image difference information 3157 of FIG. 11. If difference data does not exist (step S403: Yes), the patch applying helper program 3151 advances the process to step S404. If difference data exists (step S403: No), the patch applying helper program 3151 advances the process to step S409 (step S403). The process of step S403 is the same as the process of step S303 of FIG. 13.

If difference data does not exist (step S403: Yes), the patch applying helper program 3151 determines whether the VM to which the patch is applied notified from the patch applying program 2153 is the first VM or not. The determination is performed by confirming whether or not a record including the notified patch exists in the USAGE 31555 of the GI configuration information 3155 of FIG. 7 (step S404). The process of step S404 is the same as the process of step S404 of FIG. 13.

If a record including the notified patch does not exist in the USAGE 31555 of the GI configuration information 3155, the patch applying helper program 3151 determines that the VM to which the patch is applied is the first VM. If the VM is the first VM (step S404: Yes), the patch applying helper program 3151 advances the process to step S405. If the VM is not the first VM (step S404: No), the patch applying helper program 3151 advances the process to step S406.

If the VM is the first VM (step S404: Yes), the patch applying helper program 3151 creates a new GI by applying a patch to the replication of the GI (step S405). After the processing of step S405, or if the VM is the first VM (step S404: Yes), the patch applying helper program 3151 requests to stop the system of the VM to the patch applying program 2153 (step S405).

Next, the patch applying helper program 3151 creates a VM image from the new GI, updates the VM image configuration information of FIG. 8 (changing the corresponding relationship between the IMAGE_ID 31561 and the GI_ID 31562, and the CREATION_TIME 31563), and switches the path from the GI to the VM image (step S407). Lastly, the patch applying helper program 3151 requests the hypervisor 1151 to start the system of the VM to which the patch application has been completed, and the process is ended (step S408).

On the other hand, if difference data exists (step S403: No), the patch applying helper program 3151 notifies to start creation of the VM image for test operation to the patch applying program 2153 of the VM, and the patch applying process is completed (step S409).

Figure 17:
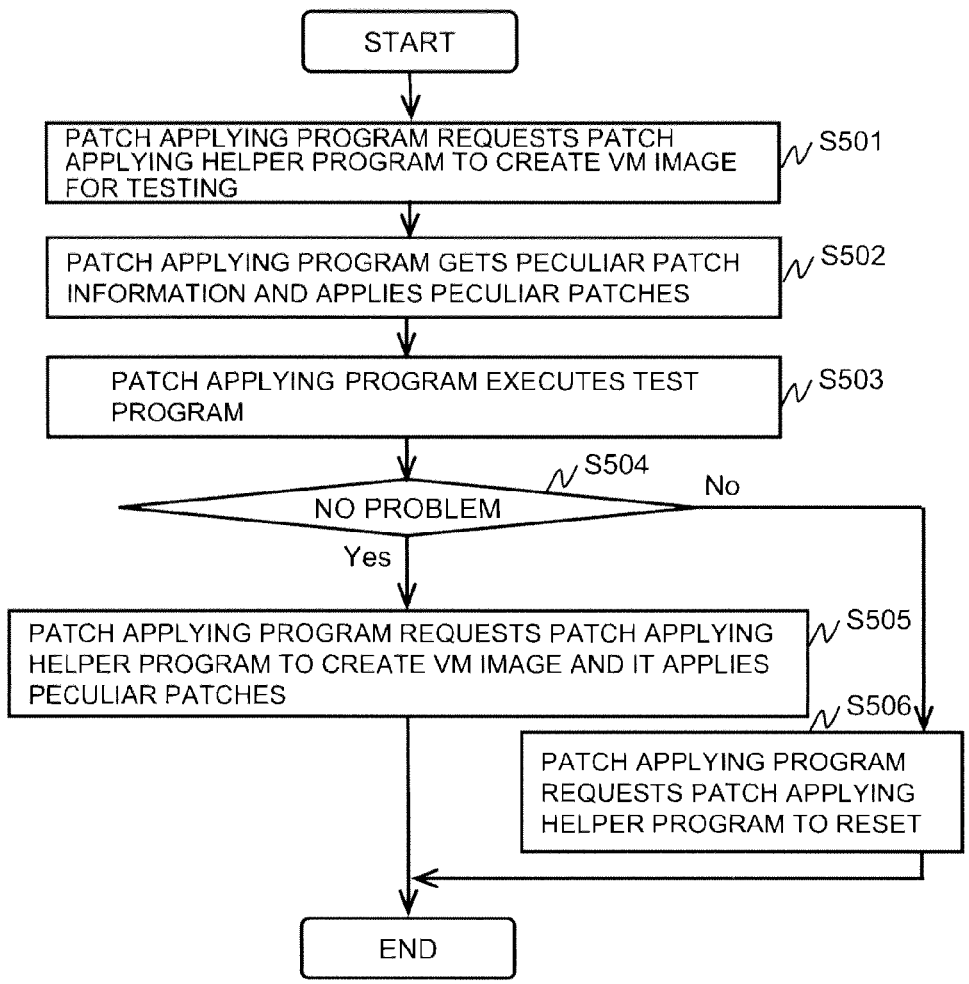
FIG. 17 is a view showing a flow of a patch applying test according to embodiment 3.

FIG. 17 is a view showing the flow of a patch applying test processing according to the third embodiment. The patch applying test processing will be described with reference to FIG. 17. When starting of creation of the VM image for test operation is notified from the patch applying helper program 3151, the patch applying program 2153 executes the following steps. The notification to start VM image creation for test Operation corresponds to the notification in step S409 of FIG. 16 mentioned earlier.

The patch applying program 2153 notifies a request to create a VM image for test operation to the patch applying helper program 3151 (step S501). Next, the patch applying program 2153 acquires a peculiar patch information 3158 (FIG. 15) from the patch applying helper program 3153, and applies a peculiar patch to the test operation system (VM image for test operation). The information of the peculiar patch is acquired from the PECULIAR_DATA 31582 of the VM image peculiar patch information 3158 (step S502).

Next, the patch applying program 2153 executes a test program 2154 to confirm that there is no problem in the test operation system (VM image for test operation) (step S503). If there is no problem in the result of execution of the test program 2154 (step S504: Yes), the patch applying program 2153 advances the process to step S505, and if a problem exists (step S504: No), the program advances the process to step S506 (step S504).

If there is no problem in the result of execution of the test program 2154 (S504: Yes), the patch applying program 2153 requests creation of a VM image for actual operation to the patch applying helper program 3151, applies the peculiar patch, updates the VM image configuration information 3156 (FIG. 8), and completes the patch applying test process (step S505). Further, the creation of the VM image for actual operation is realized by executing the processes of steps S404 through S408 of FIG. 16 mentioned earlier.

If there is no problem in the result of execution of the test program 2154 (S504: No), the patch applying program 2153 requests the patch applying helper program 3151 to switch the path to the original VM image, updates the VM image configuration information 3156 (FIG. 8) and completes the patch applying test process (step S506).

As described, the patch applying process to the VM can be performed at high speed through the cooperation of the patch applying program in the VM and the patch applying helper program in the storage system. Further, by executing a test program to a test operation system to which the peculiar patch is applied, the existence of a problem can be recognized. Thus, compared to the prior art method in which a snapshot of the GI is acquired to apply a patch to the VM image, the present embodiment enables to prevent the increase of load of the storage system accompanying the concentration of write requests and the elongation of processing time, and enables to prevent the occurrence of a failure. The patch application was requested by the user or the system administrator according to the above description, but the patch application can also he executed automatically in the computer system.

INDUSTRIAL APPLICABILITY

The present invention is applicable to computers, general-purpose computers and storage systems in which a plurality of VMs are operated, and information processing apparatuses such as a computer system composed of a computer, a general-purpose computer and a storage system, and specifically, to applying patches to VMs.

REFERENCE SIGNS LIST

1100, 1101, 1102, 1103 Host computer
1111 Host adapter
1112 CPU
1113 Memory
1114 Input device
1115 Output device
1116 Communication device
1117 System bus
1150 Nonvolatile memory
1151 Hypervisor
1152 VM configuration information
2100, 2101, 2102, 2103, 2104, 2105, 2106 VM
2111 Logical host bus adapter
2112 Logical CPU
2113 Logical memory
2114 Logical input device
2115 Logical output device
2116 Logical communication device
2117 System bus
2150 Logical disk
2151 Application program
2152 OS
2153 Patch applying program
2154 Test program
3100, 3101, 3102 Storage system
3111 Port
3112 CPU
3113 Memory
3114 Controller
3115 Physical disk
3116 Communication device
3117 System bus
3121 Volume
3122 Difference pool
3150 Nonvolatile memory
3151 Patch applying helper program
3152 Replication control program
3153 Snapshot control program
3154 Volume configuration information
3155 GI configuration information
3156 VM image configuration information
3157 VM image difference information
3158 VM image peculiar patch information
10000 Storage network
11521, 31565 VM_ID
11522 STORAGE_ID
11523 PORT_ID
11524, 31544 LUN
20000 Network
31541 VOLUME_ID
31542, 31553 SIZE
31543 PORT_ID
31551, 31562 GI_ID
31552 PARENT_ID
31554, 31563 CREATION_TIME
31555 USAGE
31561, 31571, 31581 IMAGE_ID
31564 HOST_ID
31572 DIFFERENCE_DATA
31582 PECULIAR_PATCH

The invention claimed is:

1. A storage system coupled to a computer in which a plurality of virtual computers is operated, comprising a controller and a plurality of memory devices,
wherein the storage system is configured to:
store OS data in a first volume provided by the plurality of memory devices; and
provide a plurality of first virtual volumes to which the first volume is allocated;
wherein the plurality of virtual computers is operated using any one of OS images provided by each of the plurality of first virtual volumes;
wherein the controller is configured to:
create a replication of the first volume storing the OS data when a patch applying request is received from the computer to at least two or more first virtual computers of the plurality of the virtual computers;
create a second volume by applying a patch having received the patch applying request to the replicated volume;
generate a plurality of second virtual volumes to which the second volume is allocated; and
switch the allocation of each of the first virtual computers from the plurality of the first virtual volumes to any one of the plurality of second virtual volumes;
wherein the replication of the first volume is performed by having the data stored in the first volume copied to a different volume or by having a new virtual volume associated with the first volume created;
wherein, when the allocated plurality of the second virtual volumes in a second virtual computer has difference data regarding the OS data stored in the first volume, switching is not performed for the second volume allocated to the second virtual computer,
wherein a replication of the first volume is created when a request to execute a test with respect to the second virtual computer is received;
wherein, following receipt of the patch applying request, a patch is applied to the replication of the first volume;
wherein a test volume is created by applying difference data stored in the first virtual volume allocated to the second virtual computer; and
wherein a notification is made as to a result of performing the test so as to determine whether or not the test volume has a problem.

2. The storage system according to claim 1, wherein in the first virtual computers, when a second virtual computer exists in which the allocated second virtual volume has difference data regarding the OS data stored in the first volume, the existence of the second virtual computer is notified to the computer having requested execution of application of the patch.

3. The storage system according to claim 2, wherein when it is determined based on the test result that there is a problem, switching is not performed regarding the second volume allocated to the second virtual computer.

4. A computer system comprising a computer, in which a plurality of virtual computers is operated, and a storage system coupled to the plurality of virtual computers,
wherein the storage system comprises a controller and a plurality of memory devices and is configured to:
store OS data in a first volume provided by using the plurality of memory devices; and
provide a plurality of first virtual volumes to which the first volume is allocated;
wherein the plurality of virtual computers is operated using any one of OS images provided by each of the plurality of first virtual volumes;
wherein the controller is configured to:
create a replication of the first volume storing the OS data when a patch applying request is received from the computer to at least two or more first virtual computers of the plurality of the virtual computers;
create a second volume by applying a patch having received the patch applying request to the replicated volume;
generate a plurality of second virtual volumes to which the second volume is allocated; and
switch the allocation of each of the first virtual computers from the plurality of the first virtual volumes to the plurality of the second virtual volumes;
wherein the replication of the first volume is performed by having the data stored in the first volume copied to a different volume or by having a virtual volume associated with the first volume created;
wherein when the allocated plurality of the second virtual volumes in a second virtual computer has difference data regarding the OS data stored in the first volume, switching is not performed for the second volume allocated to the second virtual computer,
wherein a replication of the first volume is created when a request to execute a test with respect to the second virtual computer is received;
wherein, following receipt of the patch applying request, a patch is applied to the replication of the first volume;
wherein a test volume is created by applying difference data stored in the first virtual volume allocated to the second virtual computer; and
wherein a notification is made as to a result of performing the test so as to determine whether or not the test volume has a problem.

5. The computer system according to claim 4, wherein in the first virtual computers, when a second virtual computer exists in which the allocated second virtual volume has difference data regarding the OS data stored in the first volume, the existence of the second virtual computer is notified to the computer having requested execution of the application of the patch.

6. The computer system according to claim 5, wherein when it is determined based on the test result that there is a problem, switching is not performed regarding the second volume allocated to the second virtual computer.

7. A patch applying method in a computer system composed of a computer, in which a plurality of virtual computers is operated, and a storage system coupled to the plurality of virtual computers, wherein the storage system comprises a controller and a plurality of memory devices, the method comprising:
storing, using the storage system, OS data in a first volume provided by using the plurality of memory devices; and
providing, using the storage system, a plurality of first virtual volumes to which the first volume is allocated;
wherein the plurality of virtual computers is operated using any one of OS images provided by each of the plurality of first virtual volumes; and
creating, using the controller, a replication of the first volume storing the OS data when a patch applying request is received from the computer to at least two or more first virtual computers of the plurality of the virtual computers;

creating, using the controller, a second volume by applying a patch having received the patch applying request to the replicated volume;
generating, using the controller, a plurality of second virtual volumes to which the second volume is allocated; and
switching, using the controller, the allocation of each of the first virtual computers from the plurality of the first virtual volumes to any one of the plurality of second virtual volumes;
wherein the replication of the first volume is performed by having the data stored in the first volume copied to a different volume or by having a virtual volume associated with the first volume created;
wherein when the allocated plurality of the second virtual volumes in a second virtual computer has difference data regarding the OS data stored in the first volume, switching is not performed for the second volume allocated to the second virtual computer, and the method further comprises:
creating a replication of the first volume when a request to execute a test with respect to the second virtual computer is received;
following receipt of the patch applying request, applying a patch to the replication of the first volume;
creating a test volume by applying difference data stored in the first virtual volume allocated to the second virtual computer; and
providing a notification as to a result of performing the test so as to determine whether or not the test volume has a problem.

8. The patch applying method according to claim 7, wherein in the first virtual computers, when a second virtual computer exists in which the allocated second virtual volume has difference data regarding the OS data stored in the first volume, the existence of the second virtual computer is notified to the computer having requested execution of application of the patch.

9. The patch applying method according to claim 8, wherein when it is determined based on the test result that there is a problem, switching is not performed regarding the second volume allocated to the second virtual computer.

* * * * *